United States Patent Office 3,069,403
Patented Dec. 18, 1962

3,069,403
PROCESS FOR POLYMERIZING UNSATURATED ESTERS
Aristotle G. Prapas, Haddonfield, N.J., assignor to W. R. Grace & Co., New York, N.Y., a corporation of Connecticut
No Drawing. Filed Nov. 10, 1960, Ser. No. 68,341
32 Claims. (Cl. 260—89.1)

This invention relates a novel polymerization process. More particularly, it is directed to the polymerization of vinyl esters and esters of acrylic and alkacrylic acids.

Summarily this invention involves the polymerization of members of the group consisting of vinyl alkanoate esters and esters of $\alpha$ alkylacrylic acids by subjecting a group member, preferably in the presence of an inert solvent to the action of a catalyst comprising an aluminum alkyl compound having the formula:

wherein R' is an alkyl or —Cl and R is an alkyl, all of said alkyls having 1 to 8 carbon atoms and an alcohol selected from the group consisting of alkenols in which the unsaturation is more than two carbon atoms removed from the hydroxyl group, and alkanols having the general formula: $C_nH_m(OH)_x$ wherein $n$ is an integer from 1 to 24 inclusive, $m$ is equal to $2n+2-x$ and $x$ is an integer from 1 to 3 inclusive. Throughout the specification whenever reference is made to an alcohol catalyst component such reference pertains to the aforementioned alcohol group members unless otherwise noted.

Operable esters of $\alpha$ alkylacrylic acids include, for example: ethylene glycol dimethacrylate, polyethylene glycol dimethacrylate, methyl methacrylate, methyl $\alpha$ ethacrylate, ethyl $\alpha$ propacrylate, propylene glycol di $\alpha$ ethacrylate, ethyl $\alpha$ phenylacrylate, methyl $\alpha$ chloroacrylate, ethyl $\alpha$ cyclohexyl acrylate, and methyl $\alpha$ decylacrylate.

The use of aluminum alkyls in recent years for polymerizing olefin monomers is well known in the art. See U.S. 2,699,457 to Ziegler et al. The effectiveness of aluminum alkyls and an alcohol as a catalyst to polymerize the aforementioned esters is surprising in view of the fact that oxygen-containing impurities, e.g., moisture, air and carbon dioxide, are well-known poisons for aluminum alkyls in the polymerization of ethylene and propylene. (See, for example, U.S. 2,781,410 to Ziegler et al.) Moreover, it is remarkable that a catalyst formed by the addition of an alcohol to an aluminum alkyl compound will polymerize the monomers (e.g. vinyl acetate) of the instant invention in view of the fact that polymerization of monomers such as vinyl acetate has not been accomplished with the aid of Ziegler catalysts. See Linear and Stereoregular Addition Polymers, Gaylord and Mark, pg. 298, Interscience Publishers, 1959. In addition, it is even more surprising that not only does the alcohol fail to have a poisonous effect on the aluminum alkyl compound in the polymerization of the aforesaid esters, but instead has a synergistic effect when combined with the aluminum alkyl compound resulting in an increased polymer yield over and above the yield obtained when the catalyst is an alcohol or an aluminum alkyl per se as will be shown hereinafter.

The reason for the synergistic effect of the catalyst components is not known. From the results it appears preferable to mix the catalyst components in the presence of the monomer. Premixing the catalyst prior to addition to the monomer to be polymerized results in lower yields; however, such yields are still greater than those obtained when the aluminum alkyl compound is used as the catalyst per se. In addition, results indicate that the catalyst components should preferably be added to the monomer at low temperatures in order to obtain optimum polymer yields. For any given polymerization reaction temperature an initially lower temperature for the catalyst addition step will result in higher polymer yields in comparison to the catalyst addition and the polymerization reaction being performed at the same temperature. Preferably, the catalyst addition step is carried out at a temperature below minus 20° C.; the lower limit being the freezing point of the solution to be polymerized. The temperature of the polymerization step at atmospheric pressure is limited by the component having the lowest boiling point. Obviously, higher temperatures can be used if superatmospheric pressure is employed. The polymerization step is ordinarily performed at a temperature in the range of minus 25 to 40° C. or more at atmospheric pressure. The preferred method is to start at the lower temperature limit and let the mixture warm up to the upper limit.

The mole ratio of the catalyst components is not critical. An aluminum alkyl compound: alcohol mole ratio of 1:0.2 to 10 is operable, preferably 1:1 is employed.

Operable catalytic alkenols in the instant invention include oleyl alcohol, ω-undecylenyl alcohol, 4-hexen-1-ol, 1-penten-5-ol, 4-octen-1-ol and 3-buten-1-ol.

The alkanols employable as the alcohol catalyst component in this invention include methanol, ethanol, 1-propanol, 2-propanol, 1-butanol, isobutyl alcohol, 2-butanol, tert-butyl alcohol, amyl alcohol, isoamyl alcohol, tert-amyl alcohol, sec-amyl alcohol, n-hexyl alcohol, n-heptyl alcohol, n-octyl alcohol, n-nonyl alcohol, n-decyl alcohol, n-undecyl alcohol, lauryl alcohol, myristyl alcohol, etc.

Although the polmerization is operable in the absence of a solvent, the polymerization is preferably carried out in the presence of a solvent. The solvent used in the practice of this invention should be one which is inert and does not interact with either the monomer to be polymerized, the catalyst employed, or the growing polymer chain. The preferred inert solvents are dry aliphatic hydrocarbon solvents in the alkane and cycloalkane groups. Examples of the preferred solvents include n-pentane, n-hexane, n-heptane, n-octane, n-nonane, and cyclohexane. However, aromatic hydrocarbons, e.g. benzene, toluene, and chlorobenzene, are operable as solvents in this invention.

The following examples are set forth to illustrate but not to limit the scope of this invention.

VINYL ACETATE POLYMERIZATION

Example 1

To a 12 oz. Pyrex polymerization bottle filled with dry nitrogen were added 10 ml. dry n-heptane, 9.3 ml. (0.1 mole) of distilled vinyl acetate and 0.20 ml. of methanol. The bottle was capped with a puncturable neoprene rubber disc and a metal cap containing a hole in the center thereof large enough to admit a syringe needle. After capping, the bottle was chilled to minus 60° C. and a syringe with a needle long enough to reach the bottom of the bottle was used to introduce 2.0 ml. of a solution of commercial grade triisobutyl aluminum (TIBA) (5.6 millimoles) in heptane through the metal cap and puncturable rubber disc. The bottle was immediately placed in a Dry Ice bath (minus 24° C.) in a light-proof vibrating container, wherein it was mechanically shaken for 5½ hours. At the end of this period, the Dry Ice bath was removed from the container and the container was mechanically shaken for an additional 16 hours at a temperature of 22° C. The container was then opened and the contents of the bottle were worked up in the following manner.

The contents of the bottle were dissolved in 50 ml. of methanol and poured into 250 ml. of a 5% aqueous solution of hydrochloric acid. The thus-precipitated polyvinyl acetate product was collected and shredded in a Waring blender with 100 cc. $H_2O$. The product was then dried at 45° C. and 30 mm. pressure overnight. The dried polymer weighed 7.8 grams representing a 90.7% conversion of the distilled vinyl acetate monomer reactant. The polyvinyl acetate product had an intrinsic viscosity of 0.7 measured in methyl ethyl ketone (MEK) at 25° C.

The following example demonstrates the operability of the present invention, in the absence of a solvent but points out the increased percent conversion obtainable when one is employed.

*Example 2*

The reaction was run as in Example 1 except that no n-heptane was added and the mixture was mechanically shaken at minus 23° C. for 4½ hours, followed by a 76 hour shaking period at room temperature (20° C.). It should be noted that the shaking period of 76 hours at room temperature was not necessary and was utilized merely as a matter of convenience. At any given temperature within the preferred temperature range for the polymerization step of the instant invention, a shaking period of 8 hours or less is sufficient to cause maximum polymer conversion obtainable. After working up the product by the procedure of Example 1, the weight of the dried polyvinyl acetate was 5.14 grams equal to a 59.8% conversion of the vinyl acetate monomer. The intrinsic viscosity of the polymer was 0.7 as measured in Example 1.

*Example 3*

A mixture of 14.0 ml. of n-heptane, 9.3 ml. (0.1 mole) of vinyl acetate, 0.24 ml. of methanol and a 2.0 ml. solution (6.0 millimoles) of triisobutyl aluminum in heptane was prepared in the way described in Example 1. The bottle containing the aforesaid mixture was placed in the vibrating container containing Dry Ice and mechanically shaken for 5½ hours at a temperature of minus 30° C. The reaction was stopped at minus 30° C. and the contents poured into a 5% aqueous HCl solution. The dried vinyl acetate polymer product, after being worked up as in Example 1, weighed 1.88 grams and had an intrinsic viscosity of 0.49 in methyl ethyl ketone at 25° C. The overall conversion based on the vinyl acetate monomer was 21.8%.

*Example 4*

A mixture identical to the one in Example 3 was prepared at room temperature (22° C.) and placed in the vibrating container. The container was mechanically shaken for 5½ hours at room temperature (22° C.). After following the work-up procedure set out in Example 1, the weight of the dried vinyl acetate polymer was 1.31 grams and the viscosity was 0.25 resulting in a 15.3% conversion of the vinyl acetate monomer. A comparison of the yields of Examples 3 and 4 with Example 1 evinces the desirability of adding the catalyst at a lower temperature and thereafter performing the polymerization step at a higher temperature as compared to carrying out the catalyst addition step and the polymerization step at the same temperature.

*Example 5*

The reaction was run as in Example 1 except that 3.4 ml. of a solution of commercial grade triethyl aluminum (TEA) in heptane (6.1 millimoles) was substituted for the triisobutyl aluminum solution (TIBA). After mechanically shaking for 5½ hours at minus 25° C. the run was discontinued. After workup the dried vinyl acetate polymer weighed 4.57 grams (53.2% conversion).

*Example 6*

A run was made identical to the previous example excepting that after mechanically shaking at minus 25° C. for 5½ hours, no more Dry Ice was added to the container and shaking was continued for another 16 hours while warming up to 16° C. The dry vinyl acetate polymer product weighed 7.07 grams resulting in an 82.4% conversion based on the vinyl acetate monomer reactant.

A comparison of Example 5 with Example 6 shows the ability of the system to continue polymerization when the temperature of the polymerization step is raised incrementally. Since the rate of polymerization at any specific temperature decreases rapidly with time, in order to obtain the highest percent conversion of the monomer, in any given time, a continually increasing temperature is preferably employed.

*Example 7*

The reaction was run as in Example 3 except that the methanol addition was 0.72 ml. instead of 0.24 ml. After mechanically shaking for 5½ hours at minus 30° C. the product was worked up as in Example 1. The dry polymer weighed 0.93 grams and had an intrinsic viscosity of 0.3 when measured in methyl ethyl ketone at 25° C. The percent conversion of the monomer was 10.8.

*Example 8*

The reaction ingredients and procedure were as in Example 3 except that no triisobutyl aluminum was added as a catalyst. After mechanically shaking at minus 30° C. for 5½ hours, no polymer was obtained.

*Example 9*

The reaction ingredients and procedure were as in Example 3 except that no methanol was added as a catalyst. After mechanically shaking for 5½ hours at minus 30° C., the polymer product obtained was worked up as in Example 1. The dried polyvinyl acetate weighed 0.23 grams resulting in a 2.7% conversion of the vinyl acetate monomer.

A comparison of Example 3 with either Example 8 or 9 discloses the synergistic effect of the catalyst components when used together as compared to using each of the catalyst components per se. While the alcohol per se failed to catalyse the polymerization reaction (Example 8), when used in conjunction with the aluminum alkyl (Example 3) an eight fold increase in polymer conversion resulted as compared to the catalyst system using aluminum alkyl per se (Example 9).

The aluminum alkyl compounds which are operable as part of the catalyst in the instant invention contain alkyl groups having 1 to 8 carbon atoms. Examples of aluminum trialkyls include trimethyl, triethyl, tripropyl, triisopropyl, tributyl, triamyl, triisoamyl, trihexyl, triisohexyl, triheptyl, and trioctyl aluminum. The aforesaid alkyl groups are also operable when the aluminum alkyl compound is a dialkyl aluminum chloride.

The following table discloses the operability of various alcohols utilizable as a catalyst component in the instant invention,

TABLE I

| Example | 10 | 11 | 12 | 13 | 14 | 15 | 16 | 17 |
|---|---|---|---|---|---|---|---|---|
| Run No | 41—1 | 41—2 | 41—3 | 41—4 | 41—5 | 41—6 | 39—2 | 39—3 |
| n-Heptane, cc | 10 | 10 | 10 | 10 | 10 | 10 | 0 | 0 |
| Vinyl acetate, cc | 9.3 | 9.3 | 9.3 | 9.3 | 9.3 | 9.3 | 9.3 | 9.3 |
| TIBA in heptane (5.6 millimoles, cc.) | 2.0 | 2.0 | 2.0 | 2.0 | 2.0 | 2.0 | 2.0 | 2.0 |
| Alcohol type | methyl | t-butyl | t-amyl | 2-octanol | 1-octadecanol | 1,3 propanediol | isopropyl | isoamyl |
| Alcohol, cc | 0.20 | 0.74 | 0.54 | 0.79 | [3] 1.35 | 0.36 | 0.38 | 0.54 |
| Catalyst addition temp., °C | −60 | −60 | −60 | −60 | −60 | −60 | −60 | −60 |
| Polymerization temp., °C.[1] | −24 | −24 | −24 | −24 | −24 | −24 | −23 | −23 |
| Polymerization temp., °C.[2] | 22 | 22 | 22 | 22 | 22 | 22 | 20 | 20 |
| Dry Polymer, gms | 7.8 | 5.92 | 6.13 | 6.49 | 3.35 | 4.80 | 4.77 | 7.47 |
| Percent conversion | 90.7 | 68.9 | 71.3 | 75.5 | 38.9 | 55.9 | 55.5 | 86.9 |
| Viscosity (MEK@25° C.) | 0.7 | 1.2 | 0.9 | 1.5 | 0.7 | 0.7 | 1.1 | 1.1 |

[1] Examples 10–15, time at temperature shown, 5½ hours; Examples 16–17, 4½ hours.
[2] Examples 10–15, time at temperature shown, 16½ hours; Examples 16–17, 76 hours.
[3] Gms. 1-octadecanol.

Example 18

12 ml. of chlorobenzene, 4.7 ml. (0.05 mole) of distilled vinyl acetate and 0.24 ml. of methanol were added to a 12 ounce Pyrex polymerization bottle previously filled with dry nitrogen at a temperature of minus 60° C. The bottle was capped with a puncturable neoprene rubber disc and metal cap with a hole through which 2.0 ml. of a solution of commercial grade triisobutyl aluminum in heptane (5.6 millimoles) was introduced by means of a syringe needle as explained in Example 1. The bottle was placed in a light-proof vibrating container maintained at a temperature of minus 23° C. by means of Dry Ice and mechanically shaken for 5 hours. After completion of the 5 hour shaking period, no more Dry Ice was added to the container and the bottle was again subjected to shaking for 18 hours while warming up to room temperature (22° C.). Upon completion of this shaking period the polymer was recovered by pouring the clear solution containing the polymer dissolved therein, into 200 cc. heptane to precipitate the polymer. The thus-precipitated polymer was collected and dissolved in 100 cc. methanol containing 10 cc. concentrated HCl. The polymer containing methanol solution was then poured into 300 cc. of water to reprecipitate the polymer. The vinyl acetate polymer was shredded in a Waring Blendor and dried at 45° C. and 75 mm. pressure overnight. The dried polymer weighed 0.63 gms. representing a 14.3% conversion of the monomer.

METHYL METHACRYLATE POLYMERIZATION

Example 19

A mixture of 9.45 ml. of methyl methacrylate, 0.20 ml. of methanol and 2.0 ml. of triisobutyl aluminum in heptane (5.6 millimoles) were prepared in the manner described in Example 1 for vinyl acetate. The bottle containing the aforesaid mixture was placed in a Dry Ice bath (minus 23° C.) in a light-proof vibrating container and mechanicaly shaken for 4½ hours. The mixture was then poured into 300 ml. methanol containing 35 ml. of concentrated hydrochloric acid to precipitate the polymer. The polymer was collected and dried at 50° C. and 30 mm. pressure. The dried methyl methacrylate polymer weghed 2.71 grams and had an intrinsic viscosity of 0.75 measured in MEK at 25° C. The percent conversion of the monomer was 30.7%.

Example 20

Following the procedure for Example 19, a mixture of 10 ml. of methyl methacrylate, 20 ml. of n-heptane, 0.24 ml. of methanol and a 4.0 ml. solution of triisobutyl aluminum in heptane (12 millimoles) was charged to a 12 ounce Pyrex polymerization bottle at a temperature of minus 60° C. The bottle was placed in a vibrating light-proof container and mechanically shaken for 6 hours at minus 40° C. followed by a shaking period of 64 hours at 17° C. The work-up of the product, following the procedure in Example 19, resulted in a dry methyl methacrylate polymer weighing 4.41 grams. The percent conversion based on the methyl methacrylate monomer reactant was 47.1%.

The following table shows the operability of the present invention when various alcohols are used as one of the catalyst components to polymerize methyl methacrylate.

TABLE II

| Example | 21 | 22 | 23 |
|---|---|---|---|
| Run No | 40—1 | 40—2 | 40—3 |
| Methyl Methacrylate, cc | 9.45 | 9.45 | 9.45 |
| TIBA in heptane, 5.6 millimoles, cc. | 2.0 | 2.0 | 2.0 |
| Alcohol type | methyl | isopropyl | isoamyl |
| Alcohol, cc | 0.20 | 0.38 | 0.54 |
| Catalyst addition temp., °C | −60 | −60 | −60 |
| Polymerization temp., °C.[1] | −23 | −23 | −23 |
| Dry polymer, gms | 2.71 | 2.03 | 2.19 |
| Percent conversion | 30.7 | 23.0 | 24.8 |
| Viscosity (MEK@ 25° C.) | 0.75 | 0.53 | 0.53 |

[1] Time at temperature, 4½ hrs.

ETHYLENE GLYCOL DIMETHACRYLATE POLYMERIZATION

Example 24

A mixture of 9.3 ml. of ethylene glycol dimethacrylate, 14.7 ml. n-heptane and a 1.0 ml. solution of triisobutyl aluminum in heptane (2.8 millimoles) were charged to a 12 ounce Pyrex polymerization bottle filled with dry nitrogen at a temperature of minus 60° C. The bottle was placed in a Dry Ice bath (−40° C.) in a light-proof vibrating container wherein it was mechanically shaken for three quarters of an hour. The polymer product was worked up by dissolving the contents of the polymerization bottle in 100 ml. of methanol and pouring the dissolved polymer solution into 500 ml. of a 5% aqueous solution of HCl. The polymer product was then washed with methanol and dried at room temperature and 28″ vacuum overnight. The dried ethylene glycol dimethacrylate polymer product weighed 2.66 grams representing a 26.9% conversion of the monomer.

Example 25

A mixture identical to the one in Example 24, excepting that 0.12 cc. methyl alcohol was also added, was mechanically shaken for three quarters of an hour. Following the work-up procedure in Example 24, the dried polymer product weighed 8.95 grams representing a 90.4% conversion of the monomer reactant.

POLYETHYLENE GLYCOL DIMETHACRYLATE POLYMERIZATION

Example 26

A mixture of 23 ml. toluene, 15 ml. polyethylene glycol dimethacrylate, 2.0 ml. of triisobutyl aluminum solution in heptane (5.6 millimoles) and 0.24 ml. of methyl alcohol were added to a 12 ounce Pyrex polymerization bottle filled with dry nitrogen at a temperature of minus 60° C. by the procedure of Example 1. The bottle was placed in a vibrating light-proof container and mechanically shaken for 2½ hours at minus 40° C. The dried polymer, after being worked up as described in Example 24, weighed 14.5 grams, represents an 89% conversion of the polyethylene glycol methacrylate monomer.

*Example 27*

To a 12 ounce Pyrex polymerization bottle filled with dry nitrogen was added 10 ml. dry n-heptane, 9.3 ml. (0.1 mole) of distilled vinyl acetate and 0.21 ml. of methanol. The bottle was capped with a puncturable neoprene rubber disc and a metal cap containing a hole in the center thereof large enough to admit a syringe needle. After capping, the bottle was chilled to minus 60° C. and a syringe with a needle long enough to reach the bottom of the bottle was used to introduce 2.0 ml. of a cyclohexane solution of commercial grade diethyl aluminum chloride (5.6 millimoles) through metal cap and puncturable rubber disc. The bottle was immediately placed in a Dry Ice-isopropanol bath (minus 25° C.) in a light-proof vibrating container, wherein it was mechanically shaken for 5½ hours. At the end of this period no more Dry Ice was added to the container and shaking was continued for another 12 hours while warming up to 27° C. The container was then opened and the contents of the bottle were worked up in the following manner: The contents of the Pyrex bottle were dissolved in 50.0 cc. methyl alcohol and poured into 250 cc. of a 5% aqueous solution of HCl. The product was collected and shredded in a Waring blender in 100 cc. $H_2O$. The product was dried at 45° C. and 30 min. pressure overnight.

The dried polyvinyl acetate product weighed 0.881 gms. representing a 10.2% conversion of the monomer reactant.

*Example 28*

The procedure of Example 27 was followed except that 5.6 millimoles of cyclohexanemethanol

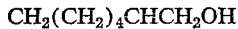

was substituted for the 0.21 ml. of methanol and 2.0 ml. of a heptane solution of commercial grade triisobutyl aluminum (5.6 millimoles) was substituted for the diethyl aluminum chloride as a catalyst. The dried polyvinyl acetate product weighed 0.384 gms. representing a 4.5% conversion of the monomer.

*Example 29*

The procedure of Example 27 was followed except that 5.6 millimoles oleyl alcohol was substituted for the 0.21 ml. of methanol and 2.0 ml. of a heptane solution of commercial grade triisobutyl aluminum (5.6 millimoles) was substituted for the diethyl aluminum chloride as a catalyst. The dried polyvinyl acetate product weighed 7.35 gms. representing an 85.5% conversion of the vinyl acetate monomer.

*Example 30*

To a 12 oz. Pyrex polymerization bottle filled with dry nitrogen was added 10.0 cc. n-hexane, 0.1 mole of methyl methacrylate monomer and 0.21 ml. methanol. The bottle was capped with a puncturable neoprene rubber disc and a metal cap containing a hole in the center thereof. After capping, the bottle was chilled to approximately minus 60° C. and a syringe with a needle was used to introduce 2.0 ml. of a solution of diethyl aluminum chloride (5.6 millimoles) in cyclohexane through the metal cap and puncturable disc. The bottle was immediately placed in a Dry Ice-isopropanol bath (minus 25° C.) inside a light-proof vibrating container wherein it was mechanically shaken for 5½ hours. At the end of this period no more Dry Ice was added to the container and shaking was continued for another 15 hours while the temperature gradually increased to 27° C. The container was then opened and the contents of the bottle were worked-up as in Example 27. The dried polymethyl methacrylate product weighed 0.361 gms. representing a 4.2% conversion of the monomer.

The alcohols used herein in the practice of this invention whether or not commercially available, require at least 0.004 cc. oxygen/cc. alcohol dissolved therein to be operative. If at least this amount of oxygen is not dissolved therein it must be added. Inherently, the commercially available alcohols used herein ordinarily contain 0.004–0.04 ccs. oxygen/cc. alcohol. However, it is possible to use a deoxygenated alcohol in practicing this invention if the necessary oxygen is added separately to the catalyst system. The operability of this catalyst system is shown in the following example:

*Example 31*

1000 ml. Pyrex flask equipped with stirrer, thermometer, and gas inlet was purged with argon to displace air therein. To the flask was added 300 ml. dry heptane as a solvent, 93 ml. distilled vinyl acetate and 2.5 ml. deoxygenated methanol. Stirring was commenced and the reactor was cooled to minus 20° C. 200 ml. dry heptane and 37 ml. triethyl aluminum were added to the flask with stirring. A nitrogen blanket was placed over the slurry in the flask and 100 cc. of pure oxygen was bubbled into the slurry. The solution turned to a cloudy color with the addition of the oxygen. The reaction was continued for 7 hours with stirring at minus 20° C. The slurry was cooled to minus 50° C. and the solution filtered. The solid polymer product was dried in an oven overnight at 60° C. 51.5 grams of dry polyvinyl acetate product was obtained.

Example 31 evidences the fact that the amount of oxygen used as a catalyst is not critical as long as the amount present in commercial alcohol, i.e. 0.004–0.04 cc. oxygen/cc. alcohol is present. As shown in Example 31 even a tremendous excess of oxygen is operable.

Copolymers of the ester monomers polymerizable by the instant invention can be obtained by subjecting the monomers in the presence of each other to the action of the catalyst disclosed herein. Thus, a vinyl acetate-methyl methacrylate copolymer is producible in the presence of a catalyst comprising an aluminum alkyl compound and an alcohol of the present invention.

The following example shows the operability of the catalyst system when excess oxygen is added to the system containing commercial alcohol having at least 0.004 cc. oxygen/cc. alcohol dissolved therein.

*Example 32*

To a 12 oz. Pyrex polymerization bottle containing 14 cc. dry n-heptane were added 134 cc. oxygen and 9.3 ml. (0.1 mole) of distilled vinyl acetate. The bottle was capped with a puncturable neoprene rubber disc and a metal cap containing a hole in the center thereof large enough to admit a syringe needle. After capping, the bottle was chilled to about minus 65° C. and a syringe was used to introduce 2.0 cc. of a solution of commercial grade triisobutyl aluminum (TIBA) (5.6 millimoles) in heptane and 0.24 cc. methanol containing at least 0.004 cc. oxygen/cc. alcohol through the metal cap and puncturable rubber disc. The bottle was immediately placed in a light-proof vibrating container at room temperature (24° C.) wherein it was mechanically shaken for 5½ hours. At the end of this period the contents of the bottle were worked up and dried as in Example 1. The dried polymer weighed 6.095 grams representing a 71.0% conversion of the distilled vinyl acetate monomer reactant. The polyvinyl acetate product had an intrinsic viscosity of 0.25 measured in methyl ethyl ketone (MEK) at 25° C.

Instead of oxygen, air may be used in performing this invention, however, since the $O_2$ content of air is low, a proportionately larger volume of air must be used to insure that at least 0.004 cc. oxygen/cc. alcohol is present.

Comparable runs substituting methyl methacrylate, ethylene glycol dimethacrylate, and polyethylene glycol dimethacrylate as the monomer reactant in place of vinyl acetate in Example 32 gave good yields of the respective polymers.

The polymerization products of this invention can be used in the same manner as the same products well known in the prior art.

This application is a continuation-in-part of a pending application U.S. Serial No. 7,106, filed February 2, 1960, now abandoned.

I claim:
1. The process of polymerizing members of the group consisting of vinyl alkanoate esters and alkyl esters of α alkylacrylic acids which comprises subjecting a group member to the action of a catalyst consisting essentially of an aluminum alkyl compound having the formula:

wherein R' is selected from the group consisting of an alkyl and —Cl and R is an alkyl, all of said alkyls having 1 to 8 carbon atoms, and an alcohol which is a member of the group consisting of alkenols in which the unsaturation is more than two carbon atoms removed from the hydroxyl group, and alkanols having the formula: $C_nH_m(OH)_x$ wherein $n$ is an integer from 1 to 24 inclusive, $m$ is equal to $2n+2-x$ and $x$ is an integer from 1 to 3 inclusive, said alcohol containing at least 0.004 cc. oxygen/cc. alcohol.

2. The process according to claim 1 wherein the polymerization is carried out in the presence of an inert hydrocarbon solvent.

3. The process according to claim 2 wherein the inert hydrocarbon solvent is an aliphatic member selected from the group consisting of alkanes and cycloalkanes.

4. The process according to claim 3 wherein the cycloalkane is cyclohexane.

5. The process of polymerizing members of the group consisting of vinyl alkanoate esters and alkyl esters of α alkylacrylic acids which comprises subjecting a group member to the action of a catalyst consisting essentially of an aluminum alkyl compound having the formula:

wherein R' is selected from the group consisting of an alkyl and —Cl and R is an alkyl, all of said alkyls having 1 to 8 carbon atoms, and an alcohol which is a member of the group consisting of alkenols in which the unsaturation is more than two carbon atoms removed from the hydroxyl group, and alkanols having the formula:

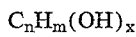

wherein $n$ is an integer from 1 to 24 inclusive, $m$ is equal to $2n+2-x$ and $x$ is an integer from 1 to 3 inclusive, and at least 0.004 cc. oxygen/cc. alcohol.

6. The process according to claim 30 wherein the polymerization is carried out in the presence of an inert hydrocarbon solvent.

7. The process according to claim 6 wherein the inert hydrocarbon solvent is an aliphatic member selected from the group consisting of alkanes and cycloalkanes.

8. The process according to claim 7 wherein the alkane is n-heptane.

9. The process according to claim 7 wherein the cycloalkane is cyclohexane.

10. The process according to claim 31 wherein the polymerization is carried out in the presence of an inert hydrocarbon solvent.

11. A process according to claim 10 wherein the inert hydrocarbon solvent is n-heptane.

12. The process according to claim 31 wherein the aluminum trialkyl is triisobutyl aluminum and the alkanol is methanol.

13. A process according to claim 32 wherein the aluminum trialkyl is triisobutyl aluminum and the alkanol is methanol.

14. The process according to claim 32 wherein the polymerization is carried out in the presence of an inert hydrocarbon solvent.

15. The process according to claim 14 wherein the inert hydrocarbon solvent is toluene.

16. The process according to claim 29 wherein the alkanol is methanol and the aluminum alkyl compound is diethyl aluminum chloride.

17. The process according to claim 29 wherein the polymerization is carried out in the presence of an inert hydrocarbon solvent.

18. The process according to claim 17 wherein the inert hydrocarbon solvent is an aliphatic member selected from the group consisting of alkanes and cycloalkanes.

19. Process according to claim 18 wherein the cycloalkane is cyclohexane.

20. The process according to claim 29 wherein the alkenol is oleyl alcohol.

21. The process of polymerizing vinyl acetate that comprises subjecting vinyl acetate monomer at a temperature of —60° C. to the action of a catalyst consisting essentially of triisobutyl aluminum and methanol in a 1 to 1 mole ratio respectively, said methanol containing at least 0.004 cc. oxygen/cc. methanol, allowing said monomer-catalyst mixture to warm up to room temperature and recovering vinyl acetate polymer.

22. The process according to claim 21 wherein the polymerization is carried out in the presence of an inert hydrocarbon solvent.

23. The process according to claim 22 wherein the inert hydrocarbon solvent is n-heptane.

24. The process of polymerizing methyl methacrylate that comprises subjecting methyl methacrylate monomer at a temperature of —23° C. to the action of a catalyst consisting essentially of triisobutyl aluminum and methanol, in a 1 to 1 mole ratio respectively, said methanol containing at least 0.004 cc. oxygen/cc. methanol, allowing said monomer-catalyst mixture to warm up to room temperature and recovering methyl methacrylate polymer.

25. The process according to claim 24 wherein the polymerization is carried out in an inert hydrocarbon solvent.

26. The process according to claim 25 wherein the inert hydrocarbon solvent is n-heptane.

27. The process of polymerizing ethylene glycol dimethacrylate that comprises subjecting ethylene glycol dimethacrylate in an n-heptane solvent at a temperature of —40° C. to the action of a catalyst consisting essentially of triisobutyl aluminum and methanol in a 1 to 1.2 mole ratio respectively, said methanol containing at least 0.004 cc. oxygen/cc. methanol, and recovering ethylene glycol dimethacrylate polymer.

28. The process of polymerizing polyethylene glycol dimethacrylate that comprises subjecting polyethylene glycol dimethacrylate in a toluene solvent at a temperature of —40° C. to the action of a catalyst consisting essentially of triisobutyl aluminum and methanol in a 1 to 1.2 mole ratio respectively, said methanol containing at least 0.004 cc. oxygen/cc. methanol, and recovering polyethylene glycol dimethacrylate polymer.

29. The process according to claim 1 in which the vinyl alkanoate ester is vinyl acetate.

30. The process according to claim 1 in which the alkyl ester of α alkylacrylic acid is methyl methacrylate.

31. The process according to claim 1 in which the alkyl ester of α alkylacrylic acid is ethylene glycol dimethacrylate.

32. The process according to claim 1 in which the alkyl ester of α alkylacrylic acid is polyethylene glycol dimethacrylate.

References Cited in the file of this patent

UNITED STATES PATENTS

| | | |
|---|---|---|
| 2,827,447 | Nowlin et al. | Mar. 18, 1958 |
| 2,842,474 | Pratt | July 8, 1958 |

FOREIGN PATENTS

| | | |
|---|---|---|
| 767,417 | Great Britain | Feb. 6, 1957 |
| 819,291 | Great Britain | Sept. 2, 1959 |